US010324961B2

(12) United States Patent
Chen et al.

(10) Patent No.: US 10,324,961 B2
(45) Date of Patent: Jun. 18, 2019

(54) AUTOMATIC FEATURE EXTRACTION FROM A RELATIONAL DATABASE

(71) Applicant: International Business Machines Corporation, Armonk, NY (US)

(72) Inventors: Bei Chen, Dublin (IE); Thanh Lam Hoang, Kildare (IE); Tiep Mai, Ho Chi Minh (VN); Mathieu Sinn, Dublin (IE); Johann-Michael Thiebaut, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 15/408,330

(22) Filed: Jan. 17, 2017

(65) Prior Publication Data
US 2018/0203918 A1      Jul. 19, 2018

(51) Int. Cl.
*G06F 16/28* (2019.01)
*G06F 16/901* (2019.01)
*G06F 16/2458* (2019.01)

(52) U.S. Cl.
CPC ........ *G06F 16/288* (2019.01); *G06F 16/2465* (2019.01); *G06F 16/9024* (2019.01); *G06F 2216/03* (2013.01)

(58) Field of Classification Search
CPC .............. G06F 16/288; G06F 16/9024; G06F 16/2465; G06F 2216/03
See application file for complete search history.

(56) References Cited

U.S. PATENT DOCUMENTS

| 6,308,155 | B1 | 10/2001 | Kingsbury et al. |
| 6,704,728 | B1 * | 3/2004 | Chang .................. G06F 16/951 |
| 7,580,918 | B2 * | 8/2009 | Chang ..................... G06F 16/20 |
| 8,694,540 | B1 | 4/2014 | Lin et al. |

(Continued)

FOREIGN PATENT DOCUMENTS

EP         20020018068        1/2004

OTHER PUBLICATIONS

"A Method to Optimize Join Performance Between Relational Database Tables and External Unstructured Data," Apr. 25, 2014, 7 pages.

(Continued)

*Primary Examiner* — Jorge A Casanova
(74) *Attorney, Agent, or Firm* — Amin, Turocy & Watson, LLP

(57) ABSTRACT

Techniques facilitating automatic feature extraction from a relational database are provided. In an embodiment, a method can include generating an entity graph based on a relational database, wherein the entity graph comprises a first node associated with a first table in the relational database and a second node associated with a second table in the relational database. In another embodiment, the method can include joining the first table and the second table based on an edge between the first table and the second table defined by the entity graph, wherein a resulting joined table is connected by a column of data. In another embodiment, the method can include extracting a feature from the column of data using a data mining algorithm selected from a set of data mining algorithms based on a type of data in the column of data.

13 Claims, 10 Drawing Sheets

(56) References Cited

U.S. PATENT DOCUMENTS

| | | | | |
|---|---|---|---|---|
| 2003/0225743 | A1* | 12/2003 | Inokuchi | G06F 16/9024 |
| 2008/0013794 | A1 | 1/2008 | Kalker et al. | |
| 2016/0104077 | A1 | 1/2016 | Jackson, Jr. et al. | |
| 2016/0140193 | A1 | 5/2016 | Handler et al. | |
| 2017/0091270 | A1* | 3/2017 | Guo | G06F 16/58 |

OTHER PUBLICATIONS

An Efficient Method for Determining the Optimum Join Sequence in a Relational Database System, Feb. 5, 2004, 3 pages.

Press, G., "Cleaning Big Data: Most Time-Consuming, Least Enjoyable Data Science Task, Survey Says," Forbes, Mar. 23, 2016, http://www.forbes.com/sites/gilpress/2016/03/23/data-preparation-most-time-consuming-least-enjoyable-data-science-task-survey-says/#357e85817f75, 6 pages.

Bengio, Y., et al., "Representation Learning: A Review and New Perspectives," IEEE Transactions on Pattern Analysis and Machine Intelligence, 2013, 30 pages.

Krizhevsky, A., et al., "ImageNet Classification with Deep Convolutional Neural Networks," Advances in Neural Information Processing Systems (NIPS) 2012, 9 pages.

Bprdes. A., et al., "Joint Learning of Words and Meaning Representations for Open-Text Semantic Parsing," Proceedings of the 15th International Conference on Artificial Intelligence and Statistics (AISTATS), 2012, pp. 127-135.

Lee, H., et al., "Efficient sparse coding algorithms," Advances in Neural Information Processing Systems (NIPS), 2006, 8 pages.

Kanter, J. M., et al., "Deep feature synthesis: Towards automating data science," IEEE International Conference on Data Science and Advanced Analytics (DSAA), 2015, 10 pages.

Leather, H., et al., "Automatic Feature Generation for Machine Learning Based Optimizing Compilation," ACM Transactions on Architecture and Code Optimization (TACO), 2014, 11 pages.

Cheng, W., et al., "Automated Feature Generation from Structured Knowledge," Proceedings of the 20th ACM international conference on Information and knowledge management, 2011, 10 pages.

Columbus, http://i.stanford.edu/hazy/victor/columbus/, Last accessed Nov. 14, 2016, 1 page.

Zhang, C., et al., "Materialization Optimizations for Feature Selection Workloads," SIGMOD, 2014, 12 pages.

Lorica, B., "Streamlining feature engineering," Radar, Jun. 15, 2014, http://radar.oreilly.com/2014/06/streamlining-feature-engineering.html, 4 pages.

Jasper, R., "Towards Automated Feature Engineering for Transactional Data," Pacific Northwest National Laboratory, Apr. 6, 2015, https://aim.pnnl.gov/seminars/towards-automated-feature-engineering-transactional-data, 1 page.

Anderson, M., et al., "Brainwash: A Data System for Feature Engineering," 6th Biennial Conference on Innovative Data Systems Research (CIDR '13), 2013, 4 pages.

"Feature learning," Wikipedia, https://en.wikipedia.org/wiki/Feature_learning, Last accessed Nov. 14, 2016, 6 pages.

List of IBM Patents and Applications Treated as Related, Date: Dec. 14, 2017.

* cited by examiner

AUTOMATIC FEATURE EXTRACTION FROM A RELATIONAL DATABASE

BACKGROUND

The subject disclosure relates to feature engineering, and more specifically to automatically extracting features from a relational database for predictive modeling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for semantic labeling are described.

According to an embodiment, a computer implemented method can include generating, by a device coupled to a processing unit, an entity graph that based on a relational database, where the entity graph comprises a first node associated with a first table in the relational database and a second node associated with a second table in the relational database. The computer implemented method can also include joining, by the device, the first table and the second table based on an edge between the first table and the second table defined by the entity graph, where a resulting joined table is connected by a column of data. The computer implemented method can also include extracting, by the device, a feature from the column of data using a data mining algorithm selected from a set of data mining algorithms based on a type of data in the column of data.

In another embodiment, the computer-implemented method can include selecting, by the device, the data mining algorithm from the set of data mining algorithms based on determining whether the data is from a group consisting of spatial-temporal data, time-series data, sequence data, item set data, number set data, singleton data, text data and image data.

According to an embodiment, a system can include a memory that stores computer executable components and a processor that executes the computer executable components stored in the memory. The computer executable components can include a graphing component that can generate a graph based on a relational database, wherein the graph has a set of nodes that correspond to respective tables in the relational database. The computer executable components can also include a joining component that can join the respective tables to form a joined table based on an edge connecting nodes of the set of nodes, wherein the joined table is joined by a column of data that is shared by the respective tables. The computer executable components can also include a feature extraction component that can extract a feature from the column of data using a data mining algorithm that is selected from a set of data mining algorithms based on a type of data in the column of data.

According to yet another embodiment, a computer implemented method can include cleaning, by a device operatively coupled to a processing unit, a relational database by filling in missing values in incomplete data and removing broken data. The computer implemented method can also include generating, by the device, using a relational database, an entity graph with a first node and a second node, wherein the first node corresponds to a first table and the second node corresponds to a second table, and wherein the first table and the second table have respective columns that are related to each other. The computer implemented method can also include joining, by the device, the first table and the second table at the respective columns that are related to each other and forming a joined column of data. The computer implemented method can also include extracting, by the device, a feature from the joined column of data using a data mining algorithm selected from a set of data mining algorithms based on a type of data in the joined column of data.

According to yet another embodiment, a system can include a memory that stores computer executable instructions and a processor that executes that computer executable instructions to perform operations. The operations can include generating an entity graph based on a relational database, wherein the entity graph comprises a first node associated with a first table in the relational database and a second node associated with a second table in the relational database. The operations can also include joining the first table and the second table based on an edge between the first table and the second table defined by the entity graph, wherein a resulting joined table is connected by a column of data. The operations can also include determining a type of the data in the column of data and selecting a data mining algorithm from a set of data mining algorithms based on the type of data in the column of data. The operations can also include extracting a feature from the column of data using the data mining algorithm.

According to yet another embodiment, computer program product can be provided to facilitate automatic feature extraction, the computer program product comprising a computer readable storage medium having program instructions embodied therewith, the program instructions executable by a processing component to cause the processing component to generate an entity graph based on a relational database, wherein the entity graph comprises a first node associated with a first table in the relational database and a second node associated with a second table in the relational database. The processing component can also receive a target variable based on a user input and join the first table and the second table based on an edge between the first table and the second table defined by the entity graph, wherein a resulting joined table is connected by a column of data and the column of data is associated with the target variable. The processing component can also extract a feature from the column of data using a data mining algorithm selected from a set of data mining algorithms based on a type of data in the column of data.

DETAILED DESCRIPTION

Figure 1:
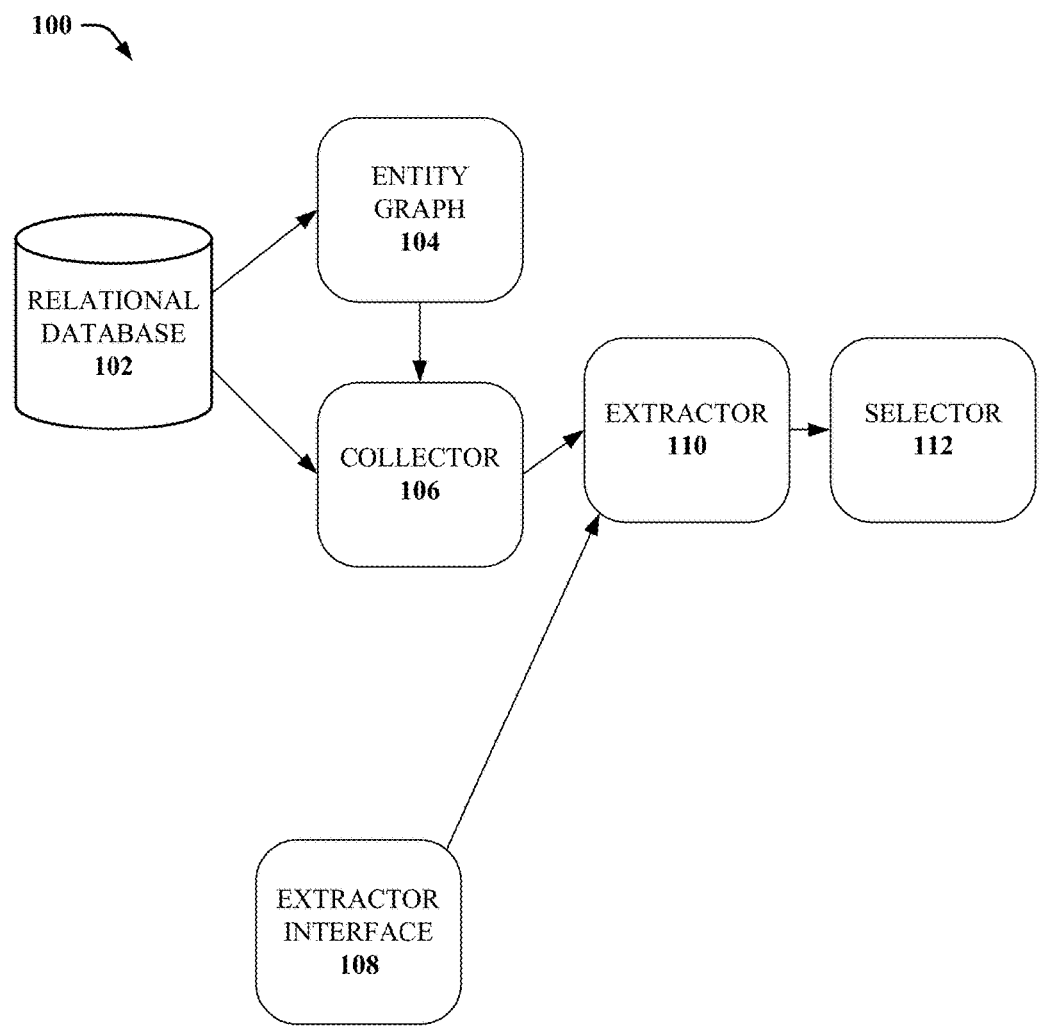
FIG. 1 illustrates a block diagram of an example, non-limiting flow graph representing a feature extraction system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments disclosed herein, provided is a system that can automatically extract features from a relational database. The feature extraction system can first generate an entity graph from the relation database, where nodes on the graph are tables, and edges define relations between the tables. The feature extraction system can then join two or more tables based on the relationships between the tables and a resulting joined table can be connected by a column of data. One or more features can be extracted from the column of data using a data mining algorithm that can be selected based on the determined type of data in the column of data. A collector can then collect each of the features extracted by traversing the graph to a predetermined depth.

Typically feature engineering can be a bottleneck during predictive analytics projects, where the feature engineering can take up to 80% of the total effort. Feature engineering is the process of using domain knowledge of the data to create features that make machine learning algorithms work. Faster, and automatic feature engineering can alleviate this bottleneck and reduce the workload of data scientists when implementing predictive solutions.

Turning now to FIG. 1 illustrated is a block diagram of an example, non-limiting flow graph 100 representing an automatic feature extraction system in accordance with one or more embodiments described herein.

The system can receive as an input a relational database 102. A relational database can include a set of tables containing data fitted into predefined categories. Each table (which can be referred to as a "relation") can contain one or more data categories in columns. Each row can contains a unique instance of data for the categories defined by the columns. For example, a typical business order entry database would include a table that described a customer with columns for name, address, phone number, and so forth. Another table would describe an order: product, customer, date, sales price, and so forth. Predictive modeling can make predictions about one or more events using the data in the relational database, but correctly understanding and interpreting relationships between the data is important.

For instance, in one embodiment, relational database 102 can include tables showing consumers profile information including income, age, location and education as well as tables showing banking transactions, transaction amounts, types of purchased products, location of shops, etc. In order to make predictions using the data in the relational database, a predictive model uses features as input for the predictive model. In the example described here, features can include elements of the data that are relevant to the desired prediction. For instance, if the predictive model was designed to predict a likelihood of a consumer applying for a credit card, determining which data is most relevant will assist in improving the accuracy of the prediction.

The system can generate an entity graph 104 from the relational database where the entity graph 104 comprises a first node associated with a first table in the relational database and a second node associated with a second table in the relational database. In an embodiment, the relational database can be first cleaned by the system. Cleaning the data can involve standardizing a format of data in the relational database and filling in missing values while also removing broken data. In an embodiment, sensitive data that may identify individual entities can be anonymized. In other embodiments, the data can be sampled in order to reduce the file size.

Once the data is cleaned, the system can generate the entity graph 104 using the existing table relationship in the database. The entity graph 104 can be extracted from the relational database schema and represent the tables as nodes, and relationships between the tables as edges between the nodes. Each node can carry a table in the relational database 102, except the root node of the entity graph 104 carries a main table where each entry of the table corresponds to one entity which is a subject of the predictive analytics problem. In an embodiment therefore, the system can receive information identifying what the target variable is before generating the entity graph 104.

A collector 106 can traverse the entity graph 104 starting at the root node or main table and traverse the entity graph to a predetermined depth. In an embodiment, the predetermined depth can be specified in input received by the system. In other embodiments, the depth can be based on processing efficiency, or as a function of the processing resources required to traverse the entity graph 104 and collect data. In an embodiment, the collector 106 can cache intermediate joining tables to save travel time and memory cost. In an embodiment, the collector 106 can also transform paths into a canonical form and check for equivalent paths to avoid redundant path traversal. If the collector 106 can determine that an equivalent path may yield similar or redundant information, the collector 106 can retain that information to avoid later traversing the redundant paths in order to save time.

A canonical form is a labeled graph Canon(G) that is isomorphic to G, such that every graph that is isomorphic to G has the same canonical form as G. Thus, from a solution to the graph canonization problem, one could also solve the problem of graph isomorphism: to test whether two graphs G and H are isomorphic, compute their canonical forms Canon(G) and Canon(H), and test whether these two canonical forms are identical. In this way, by canonizing the paths, the collector 106 can identify the redundant paths.

An extractor 110 can extract features from the collected data by determining a type of data collected, selecting an appropriate data mining algorithm based on the determined type of data, and extracting features from the columns of data using the selected data mining algorithm. The extractor 110 can also receive one or more new extractor modules from a extractor interface 108 that provides for an interface between one or more operators and the system. The extractor interface 108 allows operators to provide the system with new data mining algorithms when new types of data, or data previously unsupported, are collected. A selector 112 can then apply one or more of the extracted features into the prediction model in order to make a prediction.

Figure 2:
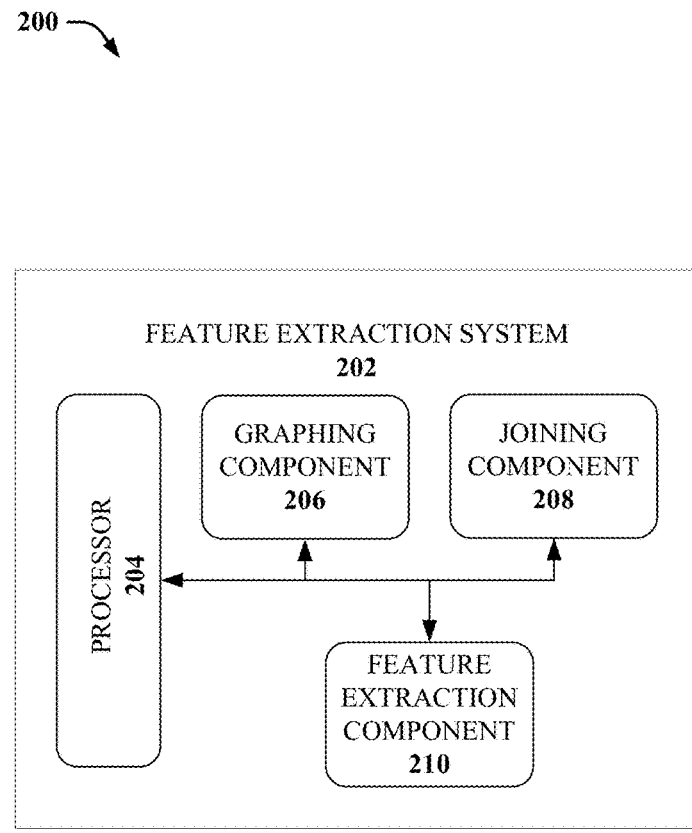
FIG. 2 illustrates another block diagram of an example, non-limiting feature extraction system that in accordance with one or more embodiments described herein.

Turning now to FIG. 2, illustrated is another block diagram 200 of an example, non-limiting feature extraction system 202 that in accordance with one or more embodiments described herein. Repetitive description of like elements employed in other embodiments described herein is omitted for sake of brevity.

In FIG. 2, the feature extraction system 202 can include a processor 204, a graphing component 206, a joining component 208, and a feature extraction component 210.

In one example, the feature extraction system 202 can be a neural network (e.g., an artificial neural network, a machine learning neural network, etc.) associated with interconnected semantic labeling that provides an estimated functional model from a set of unknown inputs. In another example, the feature extraction system 202 can be associated with a Bayesian network that provides a graphical model that represents relationships between a set of variables (e.g., a set of random variables). In yet another example, the feature extraction system 202 can be associated with a hidden Markov model that models data over a continuous time interval and/or outputs a probability distribution. However, the feature extraction system 202 can alternatively be associated with a different machine learning system such as, but not limited to, a clustering machine learning system, a decision tree machine learning system, an instance-based machine learning system, a regression machine learning system, a regularization machine learning system, rule learning machine learning system, etc. Furthermore, it is to be appreciated that the feature extraction system 202 can be any number of different types of machine learning systems to facilitate a semantic labeling process associated with a network of interconnected processing components.

The feature extraction system 202 and/or the components of the feature extraction system 202 can be employed to use hardware and/or software to solve problems that are highly technical in nature (e.g., related to bioinformatics, authentication, compression, big data analysis etc.), that are not abstract and that cannot be performed as a set of mental acts by a human. Further, some of the processes performed may be performed by specialized computers for carrying out defined tasks related to the semantic labeling application/subject area. The feature extraction system 202 and/or components of the system can be employed to solve new problems that arise through advancements in technology, computer networks, the Internet and the like. The feature extraction system 202 can provide technical improvements to feature extraction and feature engineering by improving processing efficiency among processing components in a feature extraction system, reducing delay in processing performed by processing components in a feature extraction system, avoiding or reducing the likelihood of network bottlenecks between processing components in a feature extraction system, and/or improving bandwidth utilization for a network of processing components in a feature extraction system, etc.

A processor 204 can be associated with at least one processor (e.g., a central processing unit, a graphical processing unit, etc.). In various embodiments, the processor 204 can be or include hardware, software (e.g., a set of threads, a set of processes, software in execution, etc.) or a combination of hardware and software that performs a computing task for machine learning (e.g., a machine learning computing task associated with received data). For example, the processor 204 can execute data analysis threads that cannot be performed by a human (e.g., are greater than the capability of a single human mind). For example, the amount of data processed, the speed of processing of the data and/or the data types processed by processing components 204 over a certain period of time can be respectively greater, faster and different than the amount, speed and data type that can be processed by a single human mind over the same period of time. For example, data processed by processing components 204 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processing components 204 can be fully operational towards performing one or more other functions (e.g., fully powered on, fully executed, etc.) while also processing the above-referenced data analysis data and runtime environment data.

In an embodiment, the graphing component 206 can generate a graph (e.g., entity graph 104) based on a relational database (e.g., relational database 102), wherein the graph has a set of nodes that correspond to respective tables in the relational database. In another embodiment, the joining component 208 can join the respective tables to form a joined table based on an edge connecting nodes of the set of nodes, wherein the joined table is joined by a column of data that is shared by the respective tables. In another embodiment, the feature extraction component 210 can extract a feature from the column of data using a data mining algorithm that is selected from a set of data mining algorithms based on a type of data in the column of data.

In an embodiment, the graphing component 206 receives as an input, a relational database that has been selected and cleaned by a cleaning algorithm. The cleaning algorithm can repair and or remove broken and missing data, as well as standardize the format of the data in the relational database. In one or more embodiments, the cleaning algorithm can also sample the data set, taking random or pseudo-random samples in order to reduce the file size of the data set. In other embodiments, the cleaning algorithm can anonymize the data by removing identifying and/or other sensitive information.

In an embodiment, the graphing component 206 can build an entity graph from the tables in the relational database by incrementally joining the tables at related columns. For instance if a first table has a set of columns, and a second table has a second set of columns, and a column in the first set of columns is related to another columns in the second set of columns, the graphing component 206 can make represent the tables as nodes, and connect the nodes along an edge, the edge representing the relationship between the two tables. In an embodiment, each node in the entity graph carries or represents a table in the relational database, and there can be a root node, which corresponds to a main table where each of the entry of the main table can correspond to an entity which is a subject of the predictive analytics problem. In an embodiment, the graphing component 206 can receive input indicating what the target variable is, and select the root node based on the desired target variable.

In an embodiment, the joining component 208 can then merge the tables at the related columns. The joining component 208 can determine which tables and columns are related based on the edge between the nodes in the entity graph generated by the graphing component 206 and generate a column of data that is merged from a column in the first table and a column in the second table.

In an embodiment, the feature extraction component 210 can automatically extract features from the joined column of data using a data mining algorithm that is selected based on the type of data in the column of data. The data in the column of data can be selected from a group consisting spatio-temporal data, time-series data, sequence data, item set data, number set data, singleton data, text and image data, and etc. The feature extraction component can determine which type of data is included, and then select an appropriate data mining algorithm in order to extract the features and perform pattern discovery. The output of the features can be fed into one or more predictive models. The feature extraction component 210 can also select which of the extracted features to submit to the prediction model based on a statistical relevance to the target variable.

Figure 3:
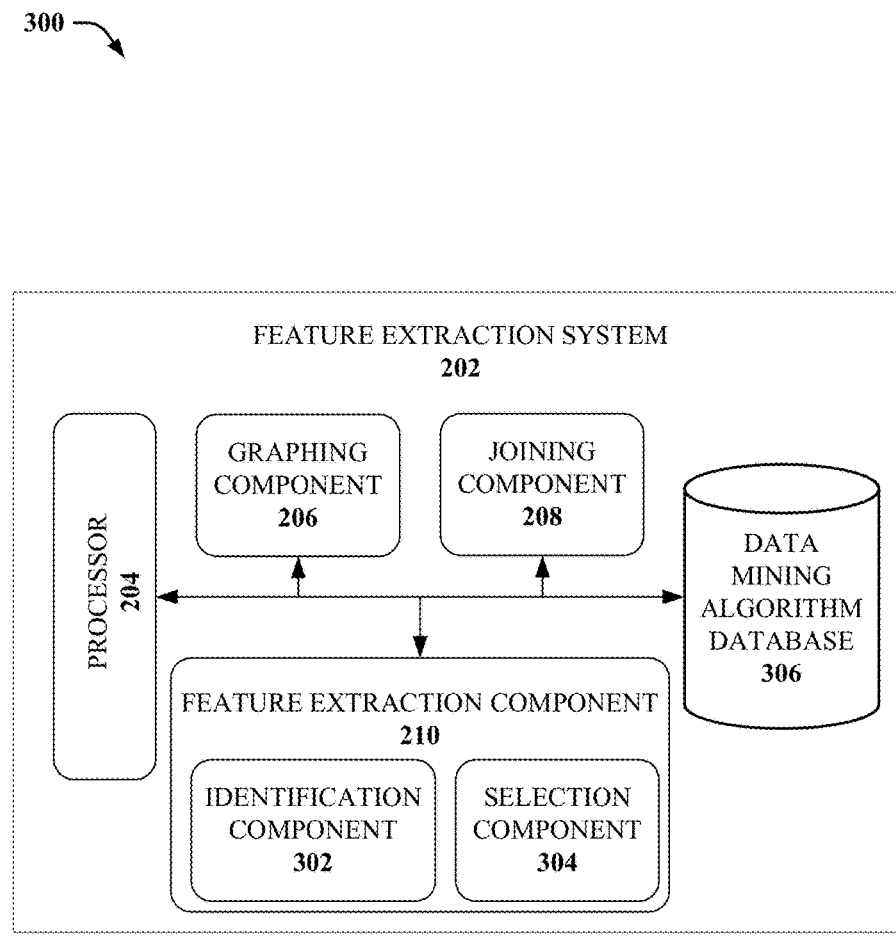
FIG. 3 illustrates another block diagram of an example, non-limiting feature extraction system that identifies a type of data and selects an appropriate data mining technique in accordance with one or more embodiments described herein.

Turning now to FIG. 3, illustrated is another block diagram 300 of an example, non-limiting feature extraction system 202 that identifies a type of data and selects an appropriate data mining technique in accordance with one or more embodiments described. herein. Repetitive description of like elements employed in other embodiments described herein is omitted for sake of brevity.

In FIG. 3, the feature extraction component 210 can include an identification component 302 and a selection component 304, and the feature extraction system 202 can further include a data mining algorithm database 306.

In an embodiment, the identification component 302 can determine a type of data in the joined column of data, and the selection component 304 can select the data mining algorithm from the data mining algorithm database 306 based whether the data is from a group consisting of spatial-temporal data, time-series data, sequence data, item set data, number set data, singleton data, text data and image data.

As an example, if the identification component 302 determines that the column of data contains time series data, the selection component 304 can select a signal processing transformation algorithm (e.g., Fast Fourier Transform or Discrete Wavelet Transform, etc.), an auto-regression algorithm (e.g., autoregressive integrated moving average, etc.), outlier detection algorithm, abnormalities detection algorithm, or simple statistics algorithm, among other algorithms.

As another example if the identification component 302 determines that the column of data contains symbolic sequences data, the selection component 304 can select a frequent sequential pattern mining algorithm, a predictive sequential pattern mining algorithm, an n-grams algorithm or a simple statistics algorithm, among other algorithms.

As another example, if the identification component 302 determines that the column of data contains itemset data, the selection component 304 can select a frequent pattern mining algorithm, predictive pattern mining algorithm, or a simple statistics algorithm among other algorithms. If the column of data is a set of numbers, the selection component 304 can select a simple statistics algorithm.

As another example, if the identification component 302 determines that the column of data contains singleton data and is a categorical value, the selection component 304 can transform the column of data into numerical features via one-hot coding or a features embedding method.

As another example, if the identification component 302 determines that the column of data contains text data, the selection component 304 can treat the text as symbolic sequence data. In other embodiments, the text mining algorithms can be selected including sentiment analysis algorithms, topical modeling using Latent Dirichlet Allocation algorithms, or word embedding algorithms.

As another example, if the identification component 302 determines that the column of data contains image data, the selection component 304 can select a computer vision based feature extraction algorithm, edge detection algorithm, or object recognition algorithm, among other algorithms.

As another example, if the identification component 302 determines that the column of data contains spatio-temporal data, the selection component 304 can select a spatio-clustering algorithm, speed and/or acceleration estimate algorithms, or annotated location algorithms, among other algorithms.

Figure 4:
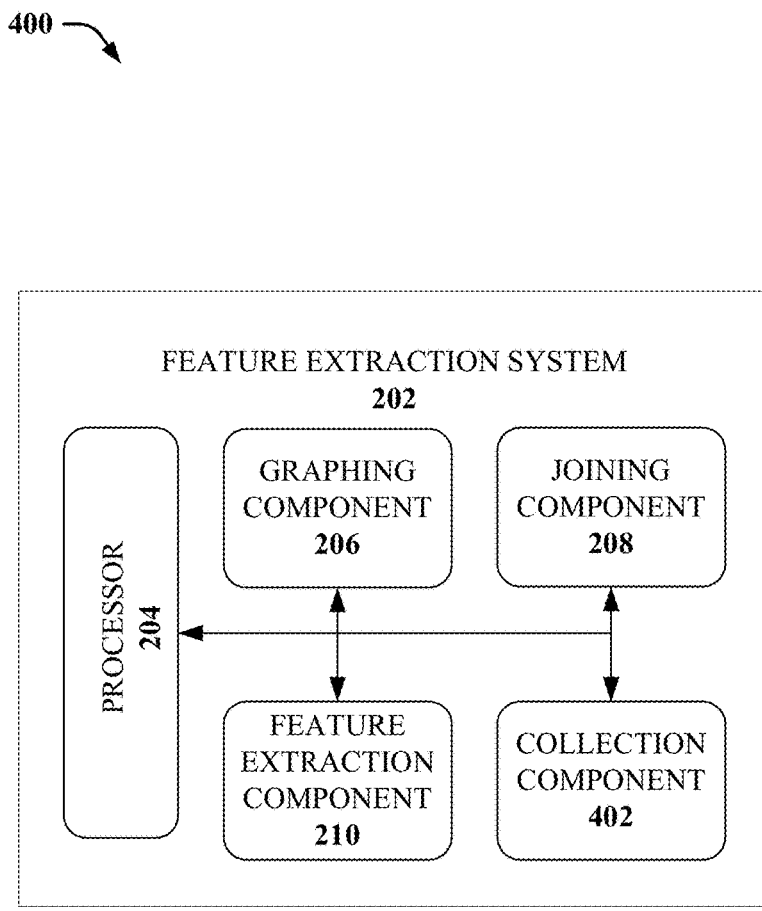
FIG. 4 illustrates another block diagram of an example, non-limiting feature extraction system that collects extracted features across a relational database in accordance with one or more embodiments described herein.

Turning now to FIG. 4, illustrated is an block diagram 400 of example, non-limiting feature extraction system 202 that collects extracted features across a relational database in accordance with one or more embodiments described herein. Repetitive description of like elements employed in other embodiments described herein is omitted for sake of brevity.

In FIG. 4, the feature extraction system 202 can include a collection component 402 that can collect features extracted from tables by traversing the graph.

The collection component 402 can traverse the entity graph starting at the root node or main table and traverse the entity graph to a predetermined depth. In an embodiment, the predetermined depth can be specified in input received by the system. In other embodiments, the depth can be based on processing efficiency, or as a function of the processing resources required to traverse the entity graph and collect data. In an embodiment, the collection component 402 can cache intermediate joining tables to save travel time and memory cost. In an embodiment, the collection component 402 can also transform paths into a canonical form and check for equivalent paths to avoid redundant path traversal. If the collection component 402 can determine that an equivalent path may yield similar or redundant information, the collection component 402 can retain that information to avoid later traversing the redundant paths in order to save time.

In an embodiment, the collection component 402 can traverse the entity graph to a depth based on a defined criterion relating to processing efficiency. If the amount of computer resources consumed surpasses a predetermined threshold, the collection component 402 can cease traversing the graph. In other embodiments the collection component 402 can receive user input indicating a desired depth with which to traverse the entity graph.

Figure 5:
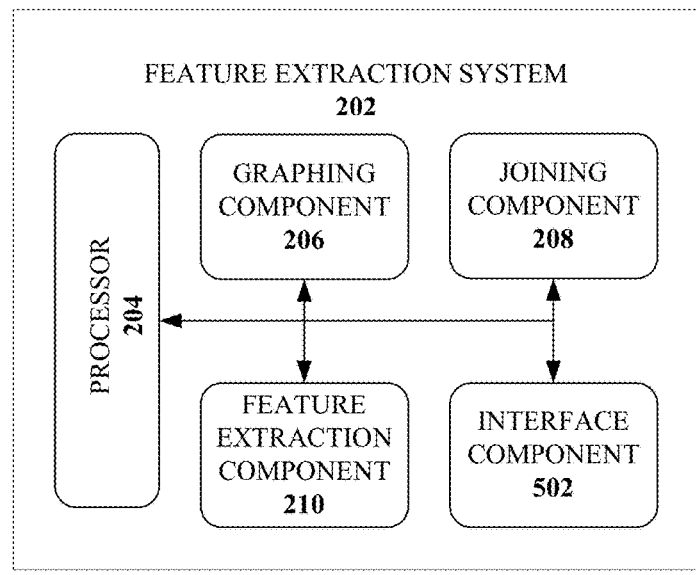
FIG. 5 illustrates another block diagram of an example, non-limiting feature extraction system that interfaces to receive new data mining algorithms in accordance with one or more embodiments described herein.

Turning now to FIG. 5, illustrated is another block diagram 500 of an example, non-limiting feature extraction system 202 that interfaces to receive new data mining algorithms in accordance with one or more embodiments described herein. Repetitive description of like elements employed in other embodiments described herein is omitted for sake of brevity.

In FIG. 5, the feature extraction system 202 can include an interface component 502 that can receive updates to the feature extraction component 210 to allow the feature extraction component 210 to extract features from a new type of data.

In response to identification component 302 determining that a data type in the column of data is unsupported, or does not have a corresponding data mining algorithm in the data mining algorithm database 306, interface component 502 can receive an updated extraction module that can include a new data mining algorithm.

In other embodiments, the interface component 502 can allow users to plug-in their own extractors to deal with new data or features that are not currently supported by the feature extraction system 202.

While FIG. 2 depicts separate components in the feature extraction component 210, respectively, it is to be appreciated that two or more components can be implemented in a common component in each of FIGS. 2-5. Further, it is to be appreciated that the design of the processor 204 and/or the graphing component 206, joining component 208, and feature extraction component 210 can include other component selections, component placements, etc., to facilitate processing for semantic labeling/or assignment of groups for parallel semantic labeling. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 6:
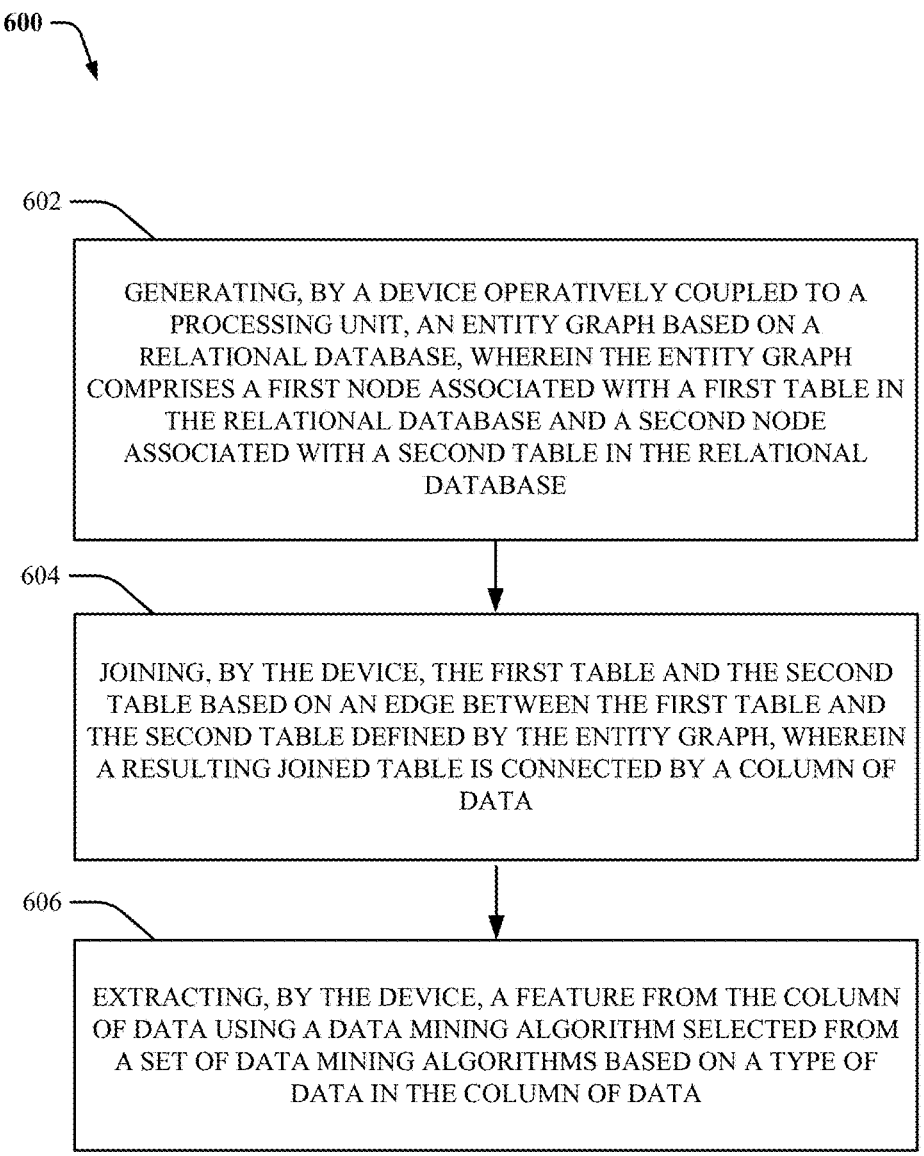
FIG. 6 illustrates a flow diagram of an example, non-limiting computer-implemented method that facilitates automatic feature extraction in accordance with one or more embodiments described herein.

Turning now to FIG. 6, illustrated is a flow diagram 600 of an example, non-limiting computer-implemented method that facilitates automatic feature extraction in accordance with one or more embodiments described herein. Repetitive description of like elements employed in other embodiments described herein is omitted for sake of brevity.

The method can begin at 902, where the method includes generating, by a device operatively coupled to a processing unit, an entity graph based on a relational database, wherein the entity graph comprises a first node associated with a first table in the relational database and a second node associated with a second table in the relational database (e.g., by graphing component 206).

The entity graph can be extracted from the relational database schema and represent the tables as nodes, and relationships between the tables as edges between the nodes. Each node can carry a table in the relational database, except the root node of the entity graph carries a main table where each entry of the table corresponds to one entity which is a subject of the predictive analytics problem. In an embodiment therefore, the system can receive information identifying what the target variable is before generating the entity graph.

The method can continue at 604, where the method includes joining, by the device, the first table and the second table based on an edge between the first table and the second table defined by the entity graph, wherein a resulting joined table is connected by a column of data (e.g., by joining component 208). The system determine which tables and columns are related based on the edge between the nodes in the entity graph and generate a column of data that is merged from a column in the first table and a column in the second table.

The method can continue at 606 where the method includes extracting, by the device, a feature from the column of data using a data mining algorithm selected from a set of data mining algorithms based on a type of data in the column of data (e.g., by feature extraction component 210). The data in the column of data can be selected from a group consisting spatio-temporal data, time-series data, sequence data, item set data, number set data, singleton data, text and image data, and etc. The feature extraction method can determine which type of data is included, and then select an appropriate data mining algorithm in order to extract the features and perform pattern discovery. The output of the features can be fed into one or more predictive models. Extracted features can also be selected to submit to the prediction model based on a statistical relevance to the target variable.

Figure 7:
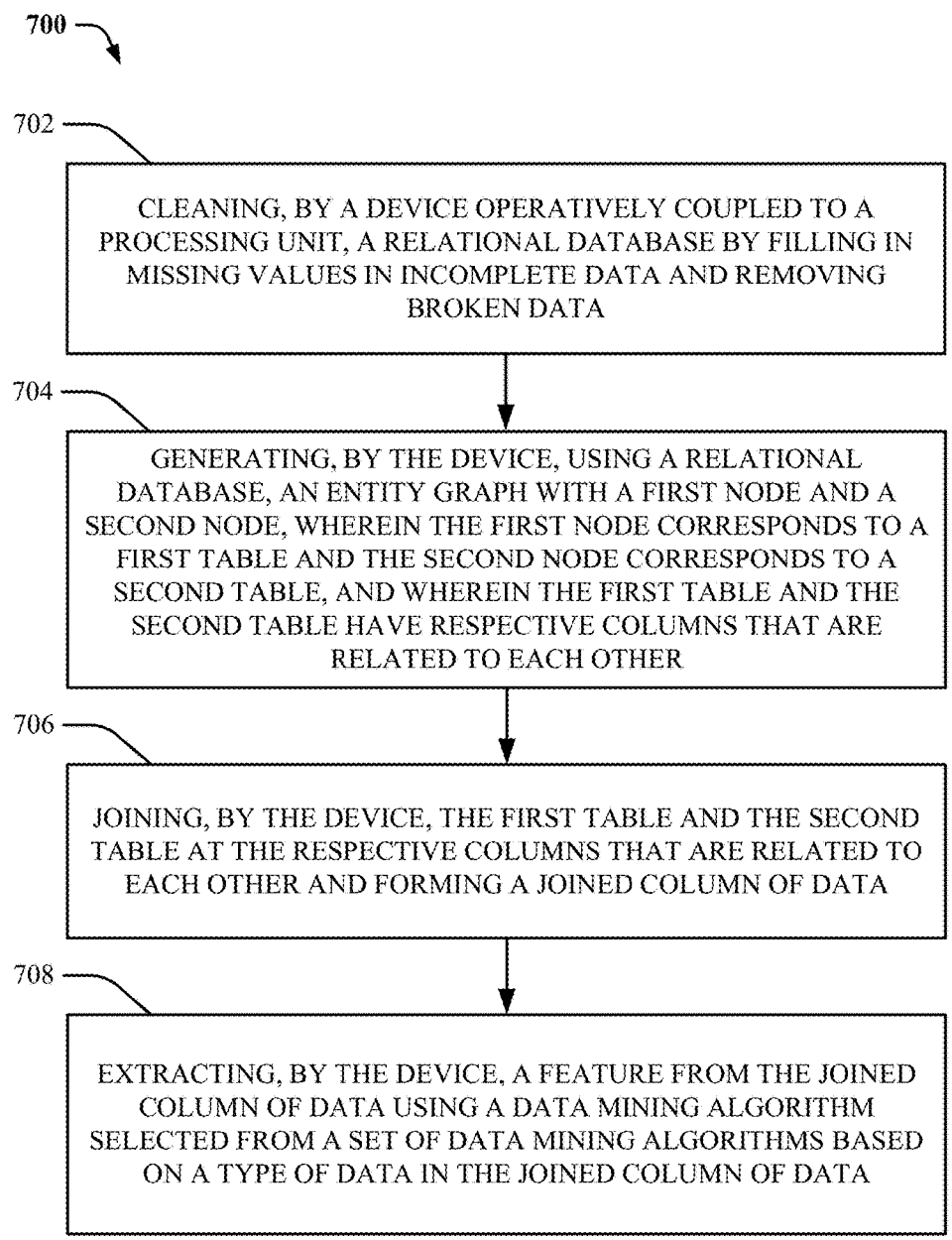
FIG. 7 illustrates a flow diagram of another example, non-limiting computer-implemented method that facilitates automatic feature extraction in accordance with one or more embodiments described herein.

Turning now to FIG. 7, illustrated is a flow diagram 700 of another example, non-limiting computer-implemented method that facilitates automatic feature extraction in accordance with one or more embodiments described herein. Repetitive description of like elements employed in other embodiments described herein is omitted for sake of brevity.

The method can begin at 702 where the method includes cleaning, by a device operatively coupled to a processing unit, a relational database by filling in missing values in incomplete data and removing broken data (e.g., by graphing component 206). Cleaning the data can involve standardizing a format of data in the relational database and filling in missing values while also removing broken data. In an embodiment, sensitive data that may identify individual entities can be anonymized In other embodiments, the data can be sampled in order to reduce the file size.

The method can continue at 704 where the method includes generating, by the device, using a relational database, an entity graph with a first node and a second node, wherein the first node corresponds to a first table and the second node corresponds to a second table, and wherein the first table and the second table have respective columns that are related to each other.

The method can continue at 706 where the method includes joining, by the device, the first table and the second table at the respective columns that are related to each other and forming a joined column of data.

The method can continue at 708 where the method includes extracting, by the device, a feature from the joined column of data using a data mining algorithm selected from a set of data mining algorithms based on a type of data in the joined column of data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a machine learning process (e.g., a semantic labeling process), transmit data that can include a sequence of bits corresponding to information generated during a machine learning process (e.g., a semantic labeling process), etc.

Figure 8:
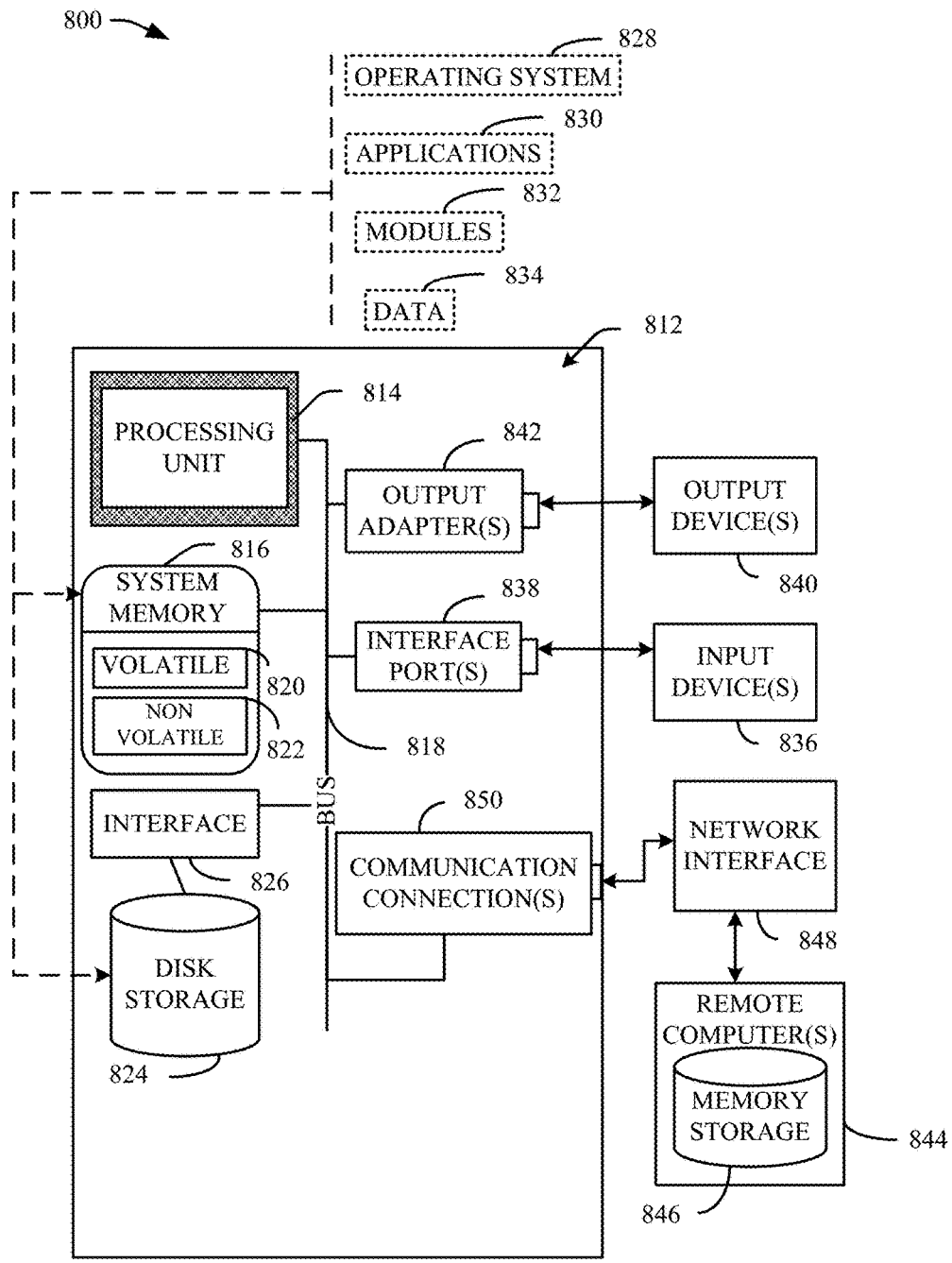
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. An entity enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
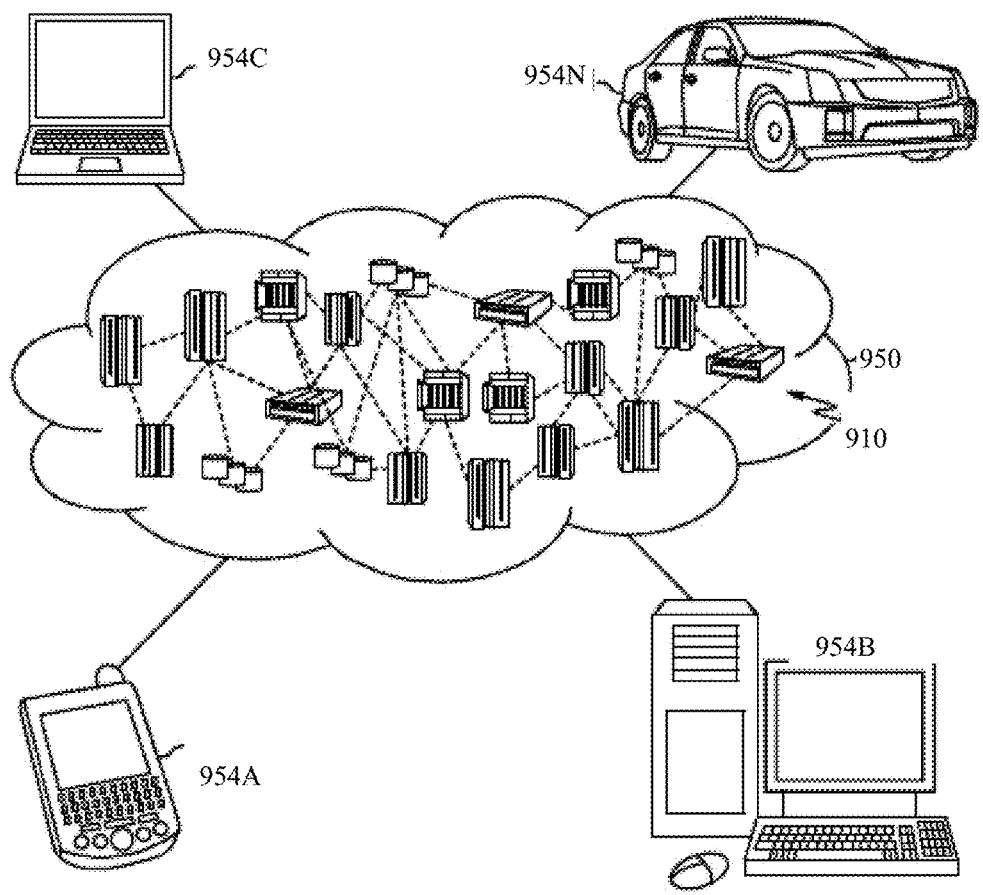
FIG. 9 illustrates a block diagram of an example, non-limiting cloud computing environment in accordance with one or more embodiments of the present invention.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 1654A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
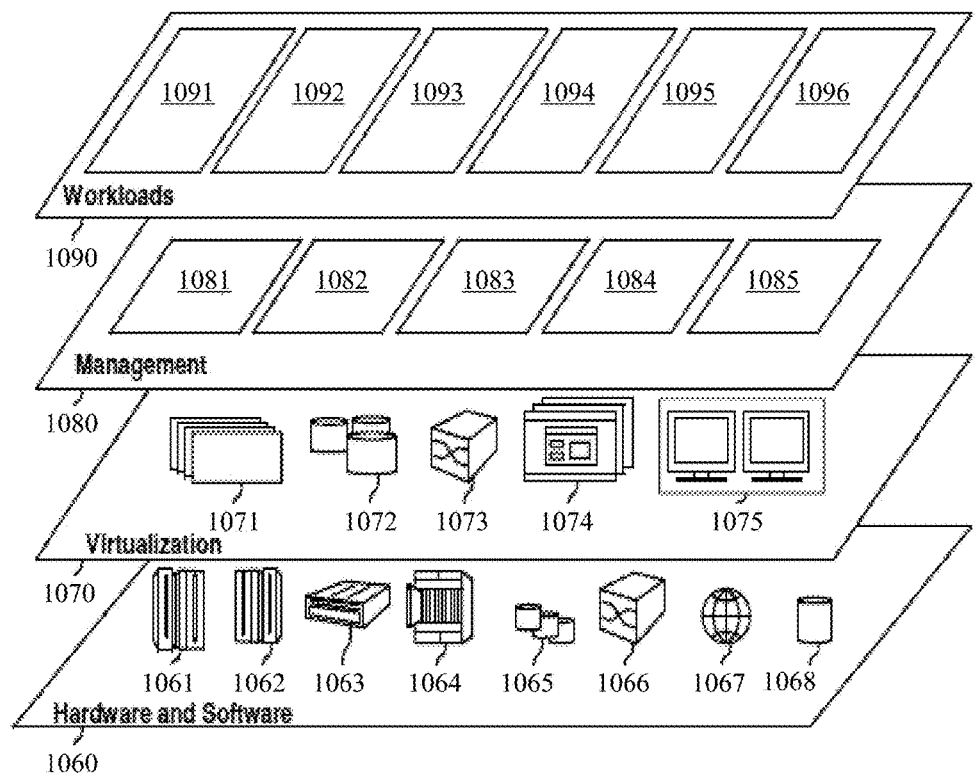
FIG. 10 illustrates a block diagram of example, non-limiting abstraction model layers in accordance with one or more embodiments of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and transaction model software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable component comprise:
      a graphing component that can generate a graph based on a relational database, wherein the graph has a set of nodes that correspond to respective tables in the relational database;
      a joining component that can join the respective tables to form a joined table based on an edge connecting nodes of the set of nodes, wherein the joined table is joined by a column of data that is shared by the respective tables; and
      a feature extraction component that can extract a feature from the column of data using a data mining algorithm that is selected from a set of data mining algorithms based on a type of data in the column of data.

2. The system of claim 1, wherein the feature extraction component further comprises:
   an identification component that can determine the type of data in the column of data; and
   a selection component that can select the data mining algorithm based whether the data is from a group consisting of spatial-temporal data, time-series data, sequence data, item set data, number set data, singleton data, text data and image data.

3. The system of claim 2, wherein the selection component can select at least one algorithm from a group consisting of a signal processing transformation algorithm, an auto-regression algorithm, an outlier detection algorithm, an abnormalities detection algorithm and a statistics algorithm in response to the identification component determining the type of data is time-series data.

4. The system of claim 2, wherein the selection component can select at least one algorithm from a group consisting of a frequent sequential pattern mining algorithm, a predictive sequential pattern mining algorithm, an n-grams model algorithm, and a statistics algorithm in response to the identification component determining the type of data is sequence data.

5. The system of claim 2, wherein the selection component can select at least one algorithm from a group consisting of a frequent pattern mining algorithm, a predictive pattern mining algorithm, and a statistics algorithm in response to the identification component determining the type of data is item set data.

6. The system of claim 1, further comprising:
   a collection component that can collect features extracted from tables by traversing the graph.

7. The system of claim 6, wherein the collection component can traverse the graph to a depth based on a defined criterion.

8. The system of claim 1 further comprising:
   an interface component that can receive updates to the feature extraction component to allow the feature extraction component to extract features from a new type of data.

9. A system, comprising:
   a memory that stores computer executable instructions,
   a processor that executes that computer executable instructions to perform operations, comprising:

generating an entity graph based on a relational database, wherein the entity graph comprises a first node associated with a first table in the relational database and a second node associated with a second table in the relational database;

joining the first table and the second table based on an edge between the first table and the second table defined by the entity graph, wherein a resulting joined table is connected by a column of data;

determining a type of the data in the column of data;

selecting a data mining algorithm from a set of data mining algorithms based on the type of data in the column of data; and extracting a feature from the column of data using the data mining algorithm.

10. The system of claim 9, wherein the operations further comprise:

collecting features extracted from tables by traversing the entity graph to a depth determined based on a defined criterion.

11. A computer program product to provide automatic feature extraction, the computer program product comprising a computer readable storage medium having program instructions embodied therewith, the program instructions executable by a processing component to cause the processing component to:

generate an entity graph based on a relational database, wherein the entity graph comprises a first node associated with a first table in the relational database and a second node associated with a second table in the relational database;

receive a target variable based on a user input;

join the first table and the second table based on an edge between the first table and the second table defined by the entity graph, wherein a resulting joined table is connected by a column of data and the column of data is associated with the target variable; and extract a feature from the column of data using a data mining algorithm selected from a set of data mining algorithms based on a type of data in the column of data.

12. The computer program product of claim 11, wherein the entity graph is traversed to a depth based on a defined criterion related to processing efficiency.

13. The computer program product of claim 11, wherein the entity graph is traversed to a depth based on a defined criterion related to the user input.

* * * * *